(12) United States Patent
Ramalingam et al.

(10) Patent No.: US 8,859,651 B2
(45) Date of Patent: Oct. 14, 2014

(54) BLENDS OF POLYSULFONES AND POLYPHENYLENE SULFIDE RESINS

(71) Applicant: Sabic Innovative Plastics IP B.V., Bergen op Zoom (NE)

(72) Inventors: Hariharan Ramalingam, Bangalore (IN); Kapil Sheth, Evansville, IN (US)

(73) Assignee: Sabic Global Technologies B.V., Bergen Op Zoom (NL)

( * ) Notice: Subject to any disclaimer, the term of this patent is extended or adjusted under 35 U.S.C. 154(b) by 0 days.

(21) Appl. No.: 13/791,673

(22) Filed: Mar. 8, 2013

(65) Prior Publication Data

US 2014/0194580 A1 Jul. 10, 2014

Related U.S. Application Data

(60) Provisional application No. 61/749,186, filed on Jan. 4, 2013.

(51) Int. Cl.
- *C08K 3/02* (2006.01)
- *C08G 69/26* (2006.01)
- *C08L 79/08* (2006.01)
- *C08L 63/04* (2006.01)
- *C08L 81/06* (2006.01)

(52) U.S. Cl.
CPC ............... *C08L 63/04* (2013.01); *C08L 79/08* (2013.01); *C08L 81/06* (2013.01)
USPC ............ 524/80; 524/538; 523/435; 525/420; 525/423; 525/430; 525/442

(58) Field of Classification Search
CPC .......... C08L 79/08; C08L 63/04; C08L 81/06
USPC ............ 525/423, 442, 420, 430; 524/538, 80; 523/483
See application file for complete search history.

(56) References Cited

U.S. PATENT DOCUMENTS

| | | | |
|---|---|---|---|
| 4,021,596 A | 5/1977 | Bailey | |
| 4,985,293 A | 1/1991 | Keep | |
| 5,075,376 A * | 12/1991 | Furuta et al. | 525/68 |
| 5,187,228 A * | 2/1993 | Perron et al. | 525/66 |
| 5,240,973 A * | 8/1993 | Katoh et al. | 522/73 |
| 5,840,793 A | 11/1998 | Glaser et al. | |
| 6,605,660 B2 * | 8/2003 | Nakamura et al. | 524/432 |
| 6,612,343 B2 | 9/2003 | Camberlin et al. | |
| 7,173,090 B2 | 2/2007 | Akiyama et al. | |
| 2005/0004292 A1 * | 1/2005 | Harashina et al. | 524/430 |
| 2011/0263791 A1 | 10/2011 | Chiong et al. | |

FOREIGN PATENT DOCUMENTS

| | | |
|---|---|---|
| CA | 2154070 | 8/2004 |
| CN | 1017600965 A | 6/2010 |
| EP | 0718350 B1 | 3/2001 |
| GB | 2113235 A | 8/1983 |
| JP | 1299872 A | 12/1989 |
| JP | 2222452 | 9/1990 |
| JP | 2252761 | 10/1990 |
| JP | 3072669 B | 11/1991 |
| JP | 4283264 A | 10/1992 |
| JP | 4339860 A | 11/1992 |
| JP | 6041430 A | 2/1994 |
| JP | 6136268 A | 5/1994 |
| JP | 9003325 A | 1/1997 |
| JP | 200248179 A | 9/2000 |
| JP | 3194385 B2 | 6/2001 |
| JP | 03630535 B | 3/2005 |
| JP | 2006054300 A | 2/2006 |
| JP | 2007002221 | 1/2007 |
| JP | 2007276456 | 10/2007 |
| JP | 2008007663 A | 1/2008 |
| JP | 2008231249 | 10/2008 |
| JP | 2008280507 | 11/2008 |
| JP | 04919542 B2 | 4/2012 |

OTHER PUBLICATIONS

J. Ind. Eng. Chem., vol. 7, No. 6, (2001) 405-409; Synthesis of Poly (Phenylene-Co-Biphenylene Sulfide) and Its Blend With Bisphenol A Polysulfone.

* cited by examiner

*Primary Examiner* — Hannah Pak
(74) *Attorney, Agent, or Firm* — Novak Druce Connolly Bove + Quigg LLP

(57) ABSTRACT

Compositions including a blend of a) a polysulfone (PSU); b) a polyphenylene sulfide (PPS); and, c) a polyetherimide and epoxy. The polyetherimide and epoxy can be present in an amount effective to act as a compatibilizer for the polysulfone (PSU) and polyphenylene sulfide (PPS).

Various embodiments relate to a method of compatibilizing a blend of polysulfone (PSU) and polyphenylene sulfide (PPS). The method can include a) melt mixing a polysulfone (PSU) and a polyetherimide; and b) melt mixing a polyphenylene sulfide (PPS) and an epoxy. Step a) and b) can be carried out by one of sequential mixing and simultaneous mixing.

8 Claims, No Drawings

BLENDS OF POLYSULFONES AND POLYPHENYLENE SULFIDE RESINS

CROSS REFERENCE TO RELATED APPLICATIONS

This application is a Non-Provisional of U.S. Application Ser. No. 61/749,186 having been filed on Jan. 4, 2013, herein incorporated by reference in its entirety.

BACKGROUND OF THE INVENTION

There has long been interest in developing thermoplastic amorphous-semicrystalline blends that exhibit good mechanicals retention at high temperature and resistance to chemicals. Many polymer blends exhibiting crystalline properties are known in the art. However, these polymers generally tend to be incompatible with other polymers. When a compatible blend of a Polysulfone and another polymer is desired, it is often necessary to add a small amount of another ingredient or compatibilizer to promote more thorough blending between the two polymers. The additional ingredient may work by promoting bond formation between diverse polymer molecules. However, a compatibilizer that is effective in one system may not be effective in others; a great deal depends upon the specific functionalities of the molecules.

An important driving force in seeking new polymer blend is cost effectiveness. It is often desirable, for example, to discover new blends that have one or more desirable characteristics found in an expensive polymer, but cost less. This is usually accomplished by finding a suitable blend comprising the expensive polymer and a less expensive one.

Another reason for blending polymers is to create compositions that are better able to meet special needs than the polymer known in the art. Accordingly, it is sometimes desired to combine a Polysulfones with another polymer having special characteristics in the hope of creating a blend exhibiting the desired characteristics of both polymers. For example, polyphenylenesulfides (PPS) has very good thermal stability and chemical resistance, potentially important characteristics for a PPS blend. Polysulfones (PSU) exhibits good retention of mechanicals at high temperature. However, Polysulfone are generally incompatible with PPS. PSU/PPS blends tend to have large regions or domains of the individual polymers rather than fine, well-dispersed domains; the large domains tend to produce poor properties, e.g. parts having poor tensile properties.

BRIEF SUMMARY OF THE INVENTION

Various embodiments relate to preparation of compatible immiscible blends of Polysulfone and Polyphenylene sulfides (PPS). The new composition blends with Polyether imide/Epoxy as a compatiblizers shows excellent improvement in the mechanicals, heat and good melt flow characteristics. This phase-separated blend improves high temperature load bearing properties and dimensional stability of PPS and improves flow, chemical resistance, and FR properties of Polysulfone.

Various embodiments relate to a process in which a PPS having reactive end groups (such as thiol and chlorine) is compatibilized with Poly sulfones, or derivatives thereof, using a mixture Polyether imide and epoxies as compatibilizer. In the process of this invention two polymers to be blended are melt mixed with compatibilizer and extruded.

Certain embodiments provide a process for forming compatible PPS blends. Various embodiments provide a process for reactive compatibilizing Polysulfone with PPS. Crystallization rate of PPS along with other properties such as flow, heat resistance, chemical resistance and cost can be tailored as desired by varying the compositions of following resins such as amount of PPS, Polysulfones, Ultem and Epoxies.

These and other features, aspects, and advantages of the present invention will become better understood with reference to the following description and appended claims.

DETAILED DESCRIPTION OF THE INVENTION

The present invention may be understood more readily by reference to the following detailed description of preferred embodiments of the invention as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Various embodiments relate to a composition including a blend of a) a polysulfone (PSU); b) a polyphenylene sulfide (PPS); and, c) a polyetherimide and epoxy. The polyetherimide and epoxy can be present in an amount effective to act as a compatibilizer for the polysulfone (PSU) and polyphenylene sulfide (PPS).

The composition can have a tensile strength within a range having a lower limit and/or an upper limit. The range can include or exclude the lower limit and/or the upper limit. The lower limit and/or upper limit can be selected from 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, and 400 Mpa. For example, according to certain preferred embodiments, the composition can have a tensile strength greater than 70 MPa.

The composition can have an impact strength within a range having a lower limit and/or an upper limit. The range can include or exclude the lower limit and/or the upper limit. The lower limit and/or upper limit can be selected from 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 248, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, and 500 J/m. For example, according to certain preferred embodiments, the composition can have an impact strength of at least 35 J/m.

The composition can have an elongation at break within a range having a lower limit and/or an upper limit. The range can include or exclude the lower limit and/or the upper limit. The lower limit and/or upper limit can be selected from 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, and 300%. For example, according to certain preferred embodiments, the composition can have an elongation at break of at least 105%.

The epoxy can be an epoxy cresol novolac resin. The polyphenylene sulfide (PPS) can be a linear poly(phenylene) sulfide. The morphology of the composition can be fine, well-dispersed domains of polysulfone (PSU) and polyphenylene sulfide (PPS).

The polyetherimide can be present in an amount within a range having a lower limit and/or an upper limit. The range can include or exclude the lower limit and/or the upper limit. The lower limit and/or upper limit can be selected from 0.5, 1, 1.5, 2, 2.5, 3, 3.5, 4, 4.5, 5, 5.5, 6, 6, 5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18, 5, 19, 19.5, 20, 20.5, 21, 21.5, 22, 22.5, 23, 23.5, 24, 24.5, 25, 25.5, 26, 26, 5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, and 40 percent by weight based on the total weight of the composition. For example, according to certain preferred embodiments, the polyetherimide can be present in an amount of from 2.5-30 percent by weight based on the total weight of the composition.

The epoxy can be present in an amount within a range having a lower limit and/or an upper limit. The range can include or exclude the lower limit and/or the upper limit. The lower limit and/or upper limit can be selected from 0.1, 0.2, 0.3, 0.4, 0.5, 0.5, 0.7, 0.8, 0.9, 1, 1.1, 1.2, 1.3, 1.4, 1.5, 1.6, 1.7, 1.8, 1.9, 2, 2, 1, 2.2, 2.3, 2.4, 2.5, 2.6, 2.7, 2.8, 2.9, 3, 4, 5, 6, 7, 8, 9, 10, 11, 12, 13, 14, 15, 16, 17, 18, 19, 20, 21, 22, 23, 24, and 25 percent by weight based on the total weight of the composition. For example, according to certain preferred embodiments, the epoxy can be present in an amount of from 0.5-1.5 percent by weight based on the total weight of the composition.

The composition can exhibit a heat distortion temperature (HDT) within a range having a lower limit and/or an upper limit. The range can include or exclude the lower limit and/or the upper limit. The lower limit and/or upper limit can be selected from 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 130, 135, 140, 145, 150, 155, 160, 165, 170, 175, 180, 185, 190, 195, 200, 210, 220, 230, 240, 250, 260, 270, 280, 290, and 300 degrees Celsius. For example, according to certain preferred embodiments, the composition can exhibit a heat distortion temperature (HDT) of at least 90 degrees Celsius.

The polysulfone (PSU) can be present in an amount within a range having a lower limit and/or an upper limit. The range can include or exclude the lower limit and/or the upper limit. The lower limit and/or upper limit can be selected from 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, 50, 50.5, 51, 51.5, 52, 52.5, 53, 53, 5, 54, 54.5, 55, 55, 5, 56, 56.5, 57, 57.5, 58, 58.5, 59, 59.5, 60, 60.5, 61, 61.5, 62, 62.5, 63, 63.5, 64, 64.5, 65, 65.5, 66, 66.5, 67, 67, 5, 68, 68.5, 69, 69.5, 70, 70.5, 71, 71, 5, 72, 72.5, 73, 73.5, 74, 74.5, 75, 75.5, 76, 76.5, 77, 77.5, 78, 78.5, 79, 79, 5, and 80 percent by weight based on the total weight of the composition. For example, according to certain preferred embodiments, the polysulfone (PSU) can be present in an amount of from 22.5-67.5 percent by weight based on the total weight of the composition.

The polyphenylene sulfide (PPS) can be present in an amount within a range having a lower limit and/or an upper limit. The range can include or exclude the lower limit and/or the upper limit. The lower limit and/or upper limit can be selected from 10, 10.5, 11, 11.5, 12, 12.5, 13, 13.5, 14, 14.5, 15, 15.5, 16, 16.5, 17, 17.5, 18, 18.5, 19, 19, 5, 20, 20.5, 21, 21.5, 22, 22.5, 23, 23.5, 24, 24.5, 25, 25.5, 26, 26, 5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49, 5, 50, 50.5, 51, 51.5, 52, 52.5, 53, 53.5, 54, 54.5, 55, 55.5, 56, 56, 5, 57, 57.5, 58, 58.5, 59, 59.5, 60, 60.5, 61, 61.5, 62, 62.5, 63, 63.5, 64, 64.5, 65, 65.5, 66, 66.5, 67, 67.5, 68, 68.5, 69, 69.5, 70, 70.5, 71, 71.5, 72, 72.5, 73, 73.5, 74, 74.5, 75, 75.5, 76, 76.5, 77, 77, 5, 78, 78.5, 79, 79.5, 80, 80, 5, 81, 81.5, 82, 82.5, 83, 83.5, 84, 84, 5, 85, 85.5, 86, 86.5, 87, 87.5, 88, 88.5, 89, 89.5, and 90 percent by weight based on the total weight of the composition. For example, according to certain preferred embodiments, the polyphenylene sulfide (PPS) can be present in an amount of from 25-75 percent by weight based on the total weight of the composition.

Various embodiments relate to an extrudate comprising the composition of various other embodiments. Other embodiments relate to a molded product comprising the composition of various other embodiments.

Various embodiments relate to a method of compatibilizing a blend of polysulfone (PSU) and polyphenylene sulfide (PPS). The method can include a) melt mixing a polysulfone (PSU) and a polyetherimide; and b) melt mixing a polyphenylene sulfide (PPS) and an epoxy. Step a) and b) can be carried out by one of sequential mixing and simultaneous mixing.

The method can be performed by a two pass method, in which an initial mixture of step a) is formed in an initial pass in an extruder and step b) is performed in a second pass through the extruder. Steps a) and b) of the method can be performed in a single pass in an extruder. Steps a) and b) of the method can be performed in a twin screw, vented extruder.

Steps a) and b) can be performed at a temperature within a range having a lower limit and/or an upper limit. The range can include or exclude the lower limit and/or the upper limit. The lower limit and/or upper limit can be selected from 250, 255, 260, 265, 270, 275, 280, 285, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 368, 359, 360, 361, 362, 363, 364, 365, 366, 367, 368, 369, 370, 375, 380, 385, 390, 395, and 400 degrees Celsius. For example, according to certain preferred embodiments, steps a) and b) can be performed at a temperature in the range of from 300 to 360 degrees Celsius.

The screws can be run at a rotation within a range having a lower limit and/or an upper limit. The range can include or exclude the lower limit and/or the upper limit. The lower limit and/or upper limit can be selected from 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, and 400 rotations per minute (rpm) under vacuum. For example, according to certain preferred embodiments, the screws can be run at a rotation of about 250 rotations per minute (rpm) under vacuum.

Step a) of the method can be performed at a temperature within a range having a lower limit and/or an upper limit. The range can include or exclude the lower limit and/or the upper limit. The lower limit and/or upper limit can be selected from 250, 255, 260, 265, 270, 275, 280, 285, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 375, 380, 385, 390, 395, 400, 405, 410, 415, 420, 425, 430, 435, 440, 445, and 450 degrees Celsius. For example, according to certain preferred embodiments, step a) of the method can be performed at a temperature in the range of from 300 to 360 degrees Celsius.

Step b) of the method can be performed at a temperature within a range having a lower limit and/or an upper limit. The range can include or exclude the lower limit and/or the upper limit. The lower limit and/or upper limit can be selected from 250, 255, 260, 265, 270, 275, 280, 285, 290, 295, 300, 305, 310, 315, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, and 500 degrees Celsius. For example, according to certain preferred embodiments, step b) of the method can be performed at a temperature of from 330 to 340 degrees Celsius.

Various embodiments relate to a method of compatibilizing a blend of polysulfone (PSU) and polyphenylene sulfide (PPS). The method can include a) melt mixing a polyphenylene sulfide (PSU), a polyetherimide and an epoxy to form an initial mixture; and b) melt mixing the initial mixture of step a) with a polysulfone (PSU). Steps a) and b) of the method can be conducted in a vented, twin screw extruder.

Step a) of the method can be performed at a temperature within a range having a lower limit and/or an upper limit. The range can include or exclude the lower limit and/or the upper limit. The lower limit and/or upper limit can be selected from 280, 285, 290, 295, 300, 305, 310, 315, 320, 325, 330, 330.5, 331, 331.5, 332, 332.5, 333, 333.5, 334, 334.5, 335, 335.5, 336, 336.5, 337, 337.5, 338, 338.5, 339, 339.5, 340, 340.5, 341, 341.5, 342, 342.5, 343, 343.5, 344, 344.5, 345, 345.5, 346, 346.5, 347, 347.5, 348, 348.5, 349, 349.5, 350, 350.5, 351, 351.5, 352, 352.5, 353, 353.5, 354, 354.5, 355, 355.5, 356, 356.5, 357, 357.5, 358, 358.5, 359, 359.5, 360, 365, 370, 375, 380, 385, 390, 395, 400, 405, 410, 415, 420, 425, 430, 435, 440, 445, 450, 455, 460, 465, 470, 475, 480, 485, 490, 495, and 500 degrees Celsius. For example, according to certain preferred embodiments, step a) of the method can be performed at a temperature in the range of 340 to 350 degrees Celsius.

Step b) of the method can be performed at a temperature within a range having a lower limit and/or an upper limit. The range can include or exclude the lower limit and/or the upper limit. The lower limit and/or upper limit can be selected from 280, 285, 290, 295, 300, 305, 310, 315, 320, 325, 330, 330.5, 331, 331.5, 332, 332.6, 333, 333.5, 334, 334.6, 335, 335.5, 336, 336.5, 337, 337.5, 338, 338.5, 339, 339.5, 340, 340.5, 341, 341.5, 342, 342.5, 343, 343.5, 344, 344.5, 345, 345.5, 346, 346.5, 347, 347.5, 348, 348.5, 349, 349.5, 350, 350.5, 351, 351.5, 352, 352.5, 353, 353.5, 354, 354.5, 355, 355.5, 356, 356.5, 357, 357.5, 358, 358.5, 359, 359.5, 360, 365, 370, 375, 380, 385, 390, 395, 400, 405, 410, 415, 420, 425, 430, 435, 440, 445, 450, 455, 460, 465, 470, 475, 480, 485, 490, 495, and 500 degrees Celsius. For example, according to certain preferred embodiments, step b) of the method can be performed at a temperature in the range of 340 to 350 degrees Celsius.

EXAMPLES

Table 1 summarizes the materials used in the examples.

TABLE 1

| Material | Description | Source |
| --- | --- | --- |
| Polysulfone | Udel ® | Solvay |
| Polyetherimide | ULTEM ® | SABIC Innovative Plastics |
| Linear poly(phenylene sulfide) | Fortron ® 0214B | Ticona |
| Polymeric compound having an average of 24 pendant epoxy per molecule | Joncryl ® ADR4368 | BASF |
| Epoxy cresol novolac resin (ECN) | Poly(o-cresyl glycidyl ether)-co-formaldehyde | Aldrich |

Techniques & Procedures

Composition Preparation Techniques: Resin compositions were formed by melt mixing the polysulfone and poly(phenylene sulfide)s. Blends were prepared by extrusion in a 2.5-inch twin screw, vacuum vented extruder. Compositions are listed in weight percent, based on the total weight of the composition in the tables below. The extruder was set at about 300-350° C. The blends were run at approximately 250 rotations per minute (rpm) under vacuum. Compositions were made in a one pass method (in accordance to the composition preparation procedure described above) or a two pass method in which the polysulfone and polyetherimide were melt mixed at 350 to 360 degrees Celsius to form an initial mixture and then the initial mixture was melt mixed with the poly (arylene sulfide) and novolac resin at 330 to 340 degrees Celsius or modified two pass method in which the polyetherimide, poly (arylene sulfide) and novolac resin were melt mixed at 340 to 350 degrees Celsius to form an initial mixture and then the initial mixture was melt mixed with the polysulfone resin at 340 to 350 degrees Celsius. The extrudate was cooled, pelletized, and dried at 150° C. Test samples were injection molded at a set temperature of 340-350 degrees Celsius and mold temperature of 80-150 degrees Celsius using a 30 second cycle time.

Properties Testing

Properties were measured using ASTM test methods. All molded samples were conditioned for at least 48 hours at 50% relative humidity prior to testing.

ASTM D256: Notched Izod impact values were measured at room temperature on 3.2 millimeter thick bars as per ASTM 0256. Bars were notched prior to oven aging, samples were tested at room temperature. Results are in Joules per meter (J/m).

ASTM 0638: Tensile properties were measured on 3.2 millimeter type I bars as per ASTM method 0638 at 23° C. with a crosshead speed of 5 millimeters/minute. Tensile strength is reported at yield (Y), percent elongation (% Elong.) is reported at break (B). Tensile modulus, tensile strength at yield, tensile strength at break results is reported in MPa.

ASTM D648: Heat Deflection Temperature (HDT) were measured on 3.2 millimeter injection molded bar at 1.82 MPa Stress. HOT is reported in degree Celsius (C).

The composition of Polysulfones and polyphenylene sulfides has been studied heretofore. For example a resin composition formed by mixing which comprises Polysulfone and polyphenylene sulfides (a) 1-99 parts by weight of Polysulfone resin composition (b) 1-99 parts by weight of. Polyphenylene sulfides (c) 0-25% parts by weight of Polyether imide composition (d) 0.5, 1.5% parts by weight of epoxy. The total of (a), (b), (c) & (d) being 100% by weight. Blends were prepared by extrusion in a 2.5-inch twin screw, vacuum vented extruder. Compositions are listed in wt % in Tables.

Results

According to various embodiments, Polysulfones and polyphenylene sulfides are immiscible and show excellent compatibility with polyether imide and epoxy. The amount for polyether imide in the blend was limited to less than 30 wt. % and epoxy varies from 0.5-1.5 wt. %. The blends exhibit excellent processability with improved tensile and impact performance. The blends show good mechanical, heat and flow performance at certain compositions as mentioned in the Tables below.

Examples 1-8

The purpose of Examples 1-8 was to demonstrate the effect of differing amounts and types of polymeric compatibilizer in compositions having Polysulfones and poly(arylene sulfide) resins. Compositions were made in accordance to the composition preparation procedure described above. The compositions were tested as described above and results are shown in Table 2.

TABLE 2

| Polymer | 1* | 2 | 3* | 4* | 5* | 6 | 7* | 8* |
|---|---|---|---|---|---|---|---|---|
| Udel | 25 | 24.5 | 24.5 | 25 | 75 | 74.5 | 74.5 | 70 |
| PPS | 75 | 74.5 | 74.5 | 75 | 25 | 24.5 | 24.5 | 20 |
| Ultem | | | | 10 | | | | 10 |
| ECN | | 1 | | | | 1 | | |
| Joncryl | | | 1 | | | | 1 | |
| Tensile strength (MPa) | 78 | 72 | 74 | 70 | 69 | 70 | 72 | 71 |
| Tensile modulus (GPa) | 3073 | 3179 | 3291 | 3347 | 2821 | 2818 | 2959 | 2839 |
| % Elongation | 4 | 119 | 110 | 4 | 90 | 112 | 96 | 83 |
| Flexural strength (MPa) | 117 | 116 | 119 | 123 | 114 | 114 | 113 | 118 |
| Flexural modulus (GPa) | 3093 | 2914 | 2955 | 3146 | 2666 | 2731 | 2582 | 2736 |
| MFR 337° C., 6.7 Kg, 5 min (g/10 Min) | 134 | 65 | 54 | 163 | 37 | 28 | 23 | 34 |
| HDT (@ 1.82 MPa) | 93 | 93 | 93 | 94 | 145 | 147 | 148 | 153 |
| Notched Izod Impact (J/m) | 30 | 36 | 33 | 27 | 50 | 60 | 49 | 48 |

*Comparative Example

These examples demonstrate that only by using a novolac resin in the required amount yields a composition capable of achieving a combination of a tensile strength greater than or equal to 70 MPa, impact strength of greater than or equal to 35 J/m, and an elongation at break greater than or equal to 105%.

Examples 9-20

The purpose of Examples 9-20 was to demonstrate the effect of differing amounts of novolac resin as well as the effect of alternate polymeric compounds having pendant epoxy groups in compositions having the poly(arylene sulfide) and Polysulfone resin. Compositions were made in accordance with the composition preparation procedure described above. The compositions were tested as described above and results are shown in Tables 3A and 3B.

TABLE 3A

| Polymer | 9* | 10* | 11 | 12* | 13* | 14* |
|---|---|---|---|---|---|---|
| Udel | 25 | 24.75 | 24.5 | 24.25 | 50 | 49.75 |
| PPS | 75 | 74.75 | 74.5 | 74.25 | 50 | 49.75 |
| ECN | | 0.5 | 1 | 1.5 | | 0.5 |
| Tensile strength (MPa) | 78 | 74 | 72 | 72 | 70 | 74 |
| Tensile modulus (GPa) | 3073 | 3041 | 3179 | 2883 | 2925 | 2991 |
| % Elongation | 4 | 9 | 119 | 104 | 75 | 90 |
| Flexural strength (MPa) | 117 | 111 | 116 | 115 | 114 | 114 |
| Flexural modulus (GPa) | 3093 | 2756 | 2914 | 2748 | 2589 | 2918 |
| MFR 337° C., 6.7 Kg, 5 min (g/10 min) | 134 | 104 | 65 | 17 | 92 | 39 |
| HDT (1.82 MPa) | 93 | 92 | 93 | 90 | 103 | 103 |
| Notched Izod Impact (J/m) | 30 | 36 | 36 | 43 | 34 | 39 |

*Comparative Example

TABLE 3B

| Polymer | 15 | 16* | 17* | 18* | 19 | 20* |
|---|---|---|---|---|---|---|
| Udel | 49.5 | 49.25 | 75 | 74.75 | 74.5 | 74.25 |
| PPS | 49.5 | 49.25 | 25 | 24.75 | 24.5 | 24.25 |
| ECN | 1 | 1.5 | | 0.5 | 1 | 1.5 |
| Tensile strength (MPa) | 74 | 71 | 69 | 72 | 72 | 72 |
| Tensile modulus (GPa) | 2991 | 2627 | 2821 | 2786 | 2818 | 2653 |
| % Elongation | 105 | 99 | 90 | 104 | 112 | 96 |
| Flexural strength (MPa) | 112 | 113 | 114 | 112 | 114 | 115 |
| Flexural modulus (GPa) | 2604 | 2629 | 2666 | 2642 | 2731 | 2648 |
| MFR 337° C., 6.7 Kg, 5 min (g/10 min) | 21 | 27 | 37 | 48 | 28 | 23 |
| HDT (1.82 MPa) | 103 | 102 | 145 | 146 | 147 | 144 |
| Notched Izod Impact (J/m) | 52 | 47 | 50 | 41 | 60 | 48 |

*Comparative Example

These examples demonstrate that only by using a novolac resin in the required amount yields a composition capable of achieving a combination of a tensile strength greater than or equal to 70 MPa, an impact strength of greater than or equal to 35 J/m, Heat deflection temperature greater than or equal to 90 degrees Celsius and an elongation at break greater than or equal to 105%.

Examples 21-32

The purpose of Examples 20-32 was to demonstrate the effect of differing amounts polyetherimide and also demonstrate the effect of the process used to make the composition on the final physical properties of the composition having the Polysulfone and poly(arylene sulfide) as the resin component. Compositions were made in accordance with the two pass method described above. For compositions not containing the novolac resin, (ECN), only the poly(arylene sulfide) was added to the initial mixture. The compositions were tested as described above and results are shown in Tables 4A and 4B.

TABLE 4A

| Polymer | 21* | 22* | 23 | 24* | 25* | 26* |
|---|---|---|---|---|---|---|
| Udel | 67.5 | 67.5 | 67.5 | 67.5 | 45 | 45 |
| Ultem 1040 | 7.5 | 7.5 | 7.5 | 7.5 | 5 | 5 |
| PPS | 25 | 25 | 25 | 25 | 50 | 50 |
| ECN |  | 0.5 | 1 | 1.5 |  | 0.5 |
| Tensile strength (MPa) | 60 | 76 | 77 | 76 | 73 | 76 |
| Tensile modulus (GPa) | 2780 | 2838 | 2791 | 2844 | 2929 | 2973 |
| % Elongation | 33 | 90 | 115 | 97 | 80 | 103 |
| Flexural strength (MPa) | 116 | 119 | 119 | 119 | 118 | 117 |
| Flexural modulus (GPa) | 2593 | 2636 | 2672 | 2638 | 2783 | 2708 |
| MFR 337° C., 6.7 Kg, 5 min (g/10 min) | 39 | 30 | 25 | 37 | 92 | 48 |
| HDT (1.82 MPa) | 152 | 151 | 151 | 152 | 109 | 110 |
| Notched Izod Impact (J/m) | 45 | 49 | 59 | 59 | 37 | 38 |

*Comparative Example

TABLE 4B

| Polymer | 27 | 28* | 29* | 30* | 31 | 32* |
|---|---|---|---|---|---|---|
| Udel | 45 | 45 | 22.5 | 22.5 | 22.5 | 22.5 |
| Ultem 1040 | 5 | 5 | 2.5 | 2.5 | 2.5 | 2.5 |
| PPS | 50 | 50 | 75 | 75 | 75 | 75 |
| ECN | 1 | 1.5 |  | 0.5 | 1 | 1.5 |
| Tensile strength (MPa) | 76 | 74 | 60 | 61 | 73 | 77 |
| Tensile modulus (GPa) | 2984 | 3079 | 3193 | 3254 | 2961 | 3295 |
| % Elongation | 113 | 107 | 5 | 3 | 101 | 8 |
| Flexural strength (MPa) | 117 | 117 | 116 | 122 | 114 | 119 |
| Flexural modulus (GPa) | 2706 | 2717 | 2914 | 2908 | 2821 | 2838 |
| MFR 337° C., 6.7 Kg, 5 min (g/10 min) | 33 | 30 | 95 | 64 | 59 | 65 |
| HDT (1.82 MPa) | 111 | 108 | 90 | 87 | 89 | 86 |
| Notched Izod Impact (J/m) | 48 | 41 | 30 | 30 | 37 | 29 |

*Comparative Example

These results show that with increasing amounts of polyetherimide the compositions still achieve the desired levels of tensile strength, impact strength, and % elongation.

A comparison of Examples 21-32 shows that in compositions comprising of Polysulfone, linear poly(arylene sulfide) and Polyetherimide there is a marked increase in tensile strength, elongation at break and impact strength in the presence of a novolac resin. Comparative examples show that this improvement is not seen in examples comprising a Polysulfone, linear poly(arylene sulfide) and Polyether imide and also none of the compositions have a combination of a tensile strength greater than or equal to 70 MPa, impact strength of greater than or equal to 35 J/m, and an elongation at break greater than or equal to 105%.

The results are further unexpected because (as evidenced by the % Elongation at break and Impact strength results) the combination of a linear poly(arylene sulfide), Polyether imide and Polysulfone (they are immiscible and incompatible) when used in conjunction with novolac resin having an average of 2 or more epoxy groups per molecule, produce a composition that exhibits a ductility higher than the ductility of the linear poly(arylene sulfide) individually in linear poly (arylene sulfide) rich compositions.

Addition of epoxy shows good improvement in the tensile and impact strength compare to the control blends in some PPS rich and Polysulfone rich compositions. Two different types of multifunctional epoxies have been evaluated as a compatibilizer in Polysulfones-PPS system. The amount of epoxy in the composition varied from 0.5 to 1.5 wt % and 1% was found to optimum level to show enhancement in the properties like Tensile and impact properties. Also the blends shows better flow performance compare to Polysulfone resin.

It has been found that, by addition of a third component with or without epoxy (Ultem 1040) to Polysulfones-PPS blends leads to improvement in the impact and tensile strength properties of the blend in comparison with neat Polysulfone and PPS. It is likely that Ultem acts as a compatibilizing agent for Polysulfone-PPS blends especially in Polysulfones rich blends, since Ultem is compatible with Polysulfones as well as partially compatible with PPS. It is predicted that Extent XH 100, VH 1003, Ultem 6000, Siltem and Ultem 5001 resin would also be a good compatibilizer for the Polysulfone-PPS blends.

To make a secondary (Polysulfone-PPS) or ternary blend (Polysulfone-Ultem-PPS) blends, one can blend all three components and extrude in one-pass. Alternatively, in a two-pass process, two of the components (e.g. Polysulfone and Ultem) could be extruded first and then PPS and ECN added in the second. The two pass helps to get better compatibility than one pass and modified two pass, due to better reactivity and miscibility.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A composition comprising a blend of:
    a) a polysulfone (PSU)
    b) a polyphenylene sulfide (PPS); and,
    c) a polyetherimide and epoxy, wherein the polyetherimide and epoxy are present in an amount effective to act as a compatibilizer for the polysulfone (PSU) and a polyphenylene sulfide (PPS), and the polyetherimide is present in the range of 2.5-30 wt % and the epoxy is in the range of 0.5-1.5 wt %, and wherein the composition possess a tensile strength greater than 70 Mpa, an impact strength of at least 35 J/m, and an elongation at break of at least 105%.

2. The composition of claim 1, wherein the epoxy is an epoxy cresol novolac resin.

3. The composition of claim 1, wherein the polyphenylene sulfide (PPS) is a linear poly(phenylene) sulfide.

4. The composition of claim 1, wherein the morphology of the composition is fine, well-dispersed domains of polysulfone (PSU) and polyphenylene sulfide (PPS).

5. The composition of claim 1, wherein the composition exhibits a heat distortion temperature (HDT) of at least 90° C.

6. The composition of claim 1, wherein the polysulfone (PSU) is present in the range of 22.5-67.5 wt % and the polyphenylene sulfide (PPS) is present in the range of 25-75 wt %.

7. An extrudate comprising the composition of claim 1.

8. A molded product comprising the composition of claim 1.

* * * * *